(12) United States Patent
Ma et al.

(10) Patent No.: US 10,003,988 B2
(45) Date of Patent: Jun. 19, 2018

(54) DETECTING APPARATUS AND METHOD FOR DETERMINING AIR INTERFACE RESOURCES CONSUMED BY SERVICE

(71) Applicant: Huawei Technologies Co., Ltd., Shenzhen (CN)

(72) Inventors: Guojun Ma, Beijing (CN); Jinxing Zhang, Milan (IT); Qingchun Lin, Beijing (CN); Jianpeng Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 88 days.

(21) Appl. No.: 15/350,529

(22) Filed: Nov. 14, 2016

(65) Prior Publication Data

US 2017/0064574 A1 Mar. 2, 2017

Related U.S. Application Data

(63) Continuation of application No. PCT/CN2014/077562, filed on May 15, 2014.

(51) Int. Cl.
*H04W 24/08* (2009.01)
*H04W 24/06* (2009.01)
(Continued)

(52) U.S. Cl.
CPC ......... *H04W 24/08* (2013.01); *H04L 41/5032* (2013.01); *H04L 43/0882* (2013.01); *H04W 28/0205* (2013.01); *H04W 92/10* (2013.01)

(58) Field of Classification Search
CPC ..... H04W 24/06; H04W 24/08; H04W 28/00; H04W 28/0205; H04W 92/10; H04L 41/5032; H04L 43/0882
See application file for complete search history.

(56) References Cited

U.S. PATENT DOCUMENTS

| 7,493,399 | B2 * | 2/2009 | Ogura | H04W 92/12 370/328 |
| 8,837,290 | B2 * | 9/2014 | Dimou | H04W 36/30 370/235 |

(Continued)

FOREIGN PATENT DOCUMENTS

| CN | 102984212 A | 3/2013 |
| CN | 103347272 A | 10/2013 |

(Continued)

*Primary Examiner* — Ahmed Elallam

(57) ABSTRACT

Embodiments of the present invention provide a related entity, and a method for determining air interface resources consumed by a service. The related entity includes: a receiver, configured to receive, from a control plane entity, air interface connection information of a UE, and receive, from a data plane entity, service information of the UE, where the air interface connection information includes time points at which the UE establishes and releases an air interface connection, the service information includes time points at which the UE starts and stops transmitting data of a service, and the service includes a to-be-detected service; and a processor, configured to determine a target air interface connection set according to the air interface connection information and the service information, and determine air interface resource consumption information of the to-be-detected service according to the target air interface connection set.

20 Claims, 4 Drawing Sheets

(51) Int. Cl.
  *H04W 28/02*   (2009.01)
  *H04W 28/26*   (2009.01)
  *H04L 12/24*   (2006.01)
  *H04L 12/26*   (2006.01)
  *H04W 92/10*   (2009.01)

(56) References Cited

U.S. PATENT DOCUMENTS

| | | | |
|---|---|---|---|
| 2009/0232143 A1 | 9/2009 | Li et al. | |
| 2013/0021933 A1* | 1/2013 | Kovvali | H04W 88/18 370/252 |
| 2014/0029455 A1* | 1/2014 | Vitthaladevuni | H04W 24/02 370/252 |
| 2014/0092736 A1 | 4/2014 | Baillargeon | |
| 2015/0124605 A1* | 5/2015 | Gholmieh | H04W 24/08 370/232 |
| 2015/0257020 A1* | 9/2015 | Dural | H04W 24/10 370/252 |
| 2015/0281981 A1* | 10/2015 | Msallem | H04W 24/02 370/252 |
| 2016/0359750 A1* | 12/2016 | Miklos | H04L 47/24 |

FOREIGN PATENT DOCUMENTS

| | | |
|---|---|---|
| EP | 1677557 A1 | 7/2006 |
| EP | 2429232 A1 | 3/2012 |
| EP | 2140657 B1 | 10/2015 |
| WO | 0038468 | 6/2000 |
| WO | 2008133471 A1 | 11/2008 |
| WO | 2011149532 A1 | 12/2011 |

\* cited by examiner

DETECTING APPARATUS AND METHOD FOR DETERMINING AIR INTERFACE RESOURCES CONSUMED BY SERVICE

CROSS-REFERENCE TO RELATED APPLICATIONS

This application is a continuation of International Application No. PCT/CN2014/077562, filed on May 15, 2014, the disclosure of which is hereby incorporated by reference in its entirety.

TECHNICAL FIELD

The present invention relates to the communications field, and in particular, to a detecting apparatus, and a method for determining air interface resources consumed by a service.

BACKGROUND

In recent years, packet switched (Packet Switch, PS) data services develop rapidly, bringing an increase in income to operators, and at the same time, a large number of wireless network resources are occupied. A PS network carries diverse service types. For different types of data services, for example, video, social networking or other applications, a respectively unique traffic model is formed because of diversity of user groups and application characteristics of services, which directly leads to different statuses of occupation of wireless air interface resources. The operators can better use service promotions and guide configuration of network resources by determining statuses of occupation of air interface resources by different types of services.

For example, an operator considers that a service in which air interface duration consumed per megabyte of traffic is more than one hour is an inefficient service, which easily causes air interface congestion, and that a service in which a quantity of times of connection consumed per megabyte of traffic is more than 100 is an inefficient service, which easily causes a signaling storm. These services should be priorities to manage and optimize.

At present, the operator generally collects statistics, by using a manual dialing test method, about a situation of occupation of air interface resources by a service. For example, in a specialized laboratory, specialized professional personnel uses a special testing mobile phone or other tools to collect statistics about a situation of occupation of air interface resources by a service, for example, air interface duration consumed by the service or a quantity of times of air interface connection consumed by the service. This testing manner requires a lot of manpower and material resources, and has a very high cost.

In view of the foregoing problem, the operator begins to use a manner of deploying an external probe system to collect statistics about a situation of occupation of air interface resources by a service. The external probe system may collect a transmission interval of Internet Protocol (Internet Protocol, IP) packets between a user equipment (User Equipment, UE) and an access network, and calculate, according to the transmission interval of IP packets, air interface duration consumed by the service or a quantity of times of air interface connection caused by the service. Generally, the UE has a dormant time. After a wireless connection is established, if sending of IP packets between the UE and the access network is completed, the UE enters a dormant state; and when a dormant timer of the UE expires, the UE releases the wireless connection. Therefore, in order to calculate the air interface duration or the quantity of times of air interface connection, the external probe also needs to correspondingly set a dormant time. However, different UEs have different dormant times, and the external probe cannot set a different dormant time for each type of UE. Therefore, although the external probe system reduces, to some extent, the high cost generated by the manual dialing test, accuracy of a statistical result cannot be ensured.

SUMMARY

Embodiments of the present invention provide a method for determining air interface resources consumed by a service, and a detecting apparatus, which can accurately collect statistics about air interface resource consumption information of a to-be-detected service.

According to a first aspect, a detecting apparatus is provided, including: a receiving unit, configured to receive, from a control plane entity, air interface connection information of a user equipment UE, and receive, from a data plane entity, service information of the UE, where the air interface connection information includes time points at which the LTE establishes and releases an air interface connection, the service information includes time points at which the LTE starts and stops transmitting data of a service, and the service includes a to-be-detected service; and a determining unit, configured to determine a target air interface connection set according to the air interface connection information and the service information, and determine air interface resource consumption information of the to-be-detected service according to the target air interface connection set, where the target air interface connection set includes one or more target air interface connections, and the target air interface connection is an air interface connection transmitting data of the to-be-detected service.

With reference to the first aspect, in a first possible implementation manner, the determining unit is specifically configured to: determine, for each target air interface connection in the target air interface connection set, resource consumption information of the to-be-detected service on the target air interface connection; and determine the air interface resource consumption information of the to-be-detected service according to the resource consumption information of the to-be-detected service on each target air interface connection in the target air interface connection set.

With reference to the first possible implementation manner of the first aspect, in a second possible implementation manner, the resource consumption information is used to indicate consumed air interface duration, and when the determining unit determines the resource consumption information of the to-be-detected service on the target air interface connection, the determining unit is configured to: determine connection duration of the target air interface connection according to the air interface connection information; determine, according to the air interface connection information and the service information, whether the target air interface connection transmits data of another service; and if it is determined that the target air interface connection transmits data of the another service, determine, according to transmission consumption of the data of the to-be-detected service on the target air interface connection, transmission consumption of the data of the another service on the target air interface connection, and the connection duration of the target air interface connection, air interface duration consumed on the target air interface connection by the to-be-detected service, where the transmission consumption includes a quantity of times of transmission or transmission duration; or if it is determined that the target air interface connection does not transmit data of the another service, determine that air interface duration consumed on the target air interface connection by the to-be-detected service is the connection duration of the target air interface connection.

With reference to the second possible implementation manner of the first aspect, in a third possible implementation manner, when the determining unit determines the air interface resource consumption information of the to-be-detected service according to the resource consumption information of the to-be-detected service on each target air interface connection in the target air interface connection set, the determining unit is configured to determine that air interface duration consumed by the to-be-detected service is a sum of air interface duration consumed on each target air interface connection in the target air interface connection set by the to-be-detected service.

With reference to the second possible or third possible implementation manner of the first aspect, in a fourth possible implementation manner, when the determining unit determines, according to the transmission consumption of the data of the to-be-detected service on the target air interface connection, the transmission consumption of the data of the another service on the target air interface connection, and the connection duration of the target air interface connection, the air interface duration consumed on the target air interface connect ion by the to-be-detected service, the determining unit is configured to: determine, according to the service information, the transmission consumption of the data of the to-be-detected service on the target air interface connection as C1; determine, according to the service information, the transmission consumption of the data of the another service on the target air interface connection as C2; and determine the air interface duration consumed on the target air interface connection by the to-be-detected service as $C1/(C1+C2) \times T$, where T is the connection duration of the target air interface connection.

With reference to the second possible implementation manner or the third possible implementation manner of the first aspect, in a fifth possible implementation manner, the service information further includes traffic information generated between the time points at which the UE starts and stops transmitting the data of the service; and the determining unit is further configured to: determine, according to the service information, traffic generated by the to-be-detected service; and determine, according to the traffic generated by the to-be-detected service and the air interface duration consumed by the to-be-detected service, air interface duration consumed by unit traffic of the to-be-detected service.

With reference to the first possible implementation manner of the first aspect, in a sixth possible implementation manner, the resource consumption information is used to indicate a quantity of times of air interface connection that is consumed; and when the determining unit determines the resource consumption information of the to-be-detected service on the target air interface connection, the determining unit is configured to: determine, according to the air interface connection information and the service info nation, whether data that is transmitted on the target air interface connection for the first time is the data of the to-be-detected service; and if the data that is transmitted on the target air interface connection for the first time is the data of the to-be-detected service, determine that the to-be-detected service consumes the target air interface connection once.

With reference to the sixth possible implementation manner of the first aspect, in a seventh possible implementation manner, that the determining unit is configured to determine the air interface resource consumption information of the to-be-detected service according to the resource consumption information of the to-be-detected service on each target air interface connection in the target air interface connection set includes: the determining unit is configured to determine that a quantity of times of air interface connection consumed by the to-be-detected service is a sum of quantities of times of connection consumed on the target air interface connection in the target air interface connection set by the to-be-detected service.

With reference to the sixth possible implementation manner or the seventh possible implementation manner of the first aspect, in an eighth possible implementation manner, the service information further includes traffic information generated between the time points at which the UE starts and stops transmitting the data of the service; and the determining unit is further configured to: determine, according to the service information, traffic generated by the to-be-detected service; and determine, according to the traffic generated by the to-be-detected service and the quantity of times of air interface connection consumed by the to-be-detected service, a quantity of times of air interface connection consumed by unit traffic of the to-be-detected service.

With reference to the first aspect or any one of the foregoing possible implementation manners, in a ninth possible implementation manner, the control plane entity includes abase station or abase station controller, and the air interface connection includes a radio resource RR connection, a radio resource control RRC connection, a temporary block flow TBF bearer, or a radio bearer RB.

With reference to the first aspect or any one of the first possible implementation manner to the eighth possible implementation manner, in a tenth possible implementation manner, the control plane entity includes a mobility management network element, and the air interface connection includes an Iu/S1 connection.

With reference to the first aspect or any one of the foregoing possible implementation manners, in an eleventh possible implementation manner, the data plane entity includes a serving gateway or a data gateway.

According to a second aspect, a method for determining air interface resources consumed by a service is provided, including: receiving, from a control plane entity, air interface connection information of a user equipment UE, where the air interface connection information includes time points at which the UE establishes and releases an air interface connection; receiving, from a data plane entity, service information of the UE, where the service information includes time points at which the UE starts and stops transmitting data of a service, and the service includes a to-be-detected service; determining a target air interface connection set according to the air interface connection information and the service information, where the target air interface connection set includes one or more target air interface connections, and the target air interface connection is an air interface connection transmitting data of the to-be-detected service; and determining air interface resource consumption information of the to-be-detected service according to the target air interface connection set.

With reference to the second aspect, in a first possible implementation manner, the determining air interface resource consumption information of the to-be-detected service according to the target air interface connection set includes: determining, for each target air interface connection in the target air interface connection set, resource consumption information of the to-be-detected service on the target air interface connection; and determining the air interface resource consumption information of the to-be-detected service according to the resource consumption information of the to-be-detected service on each target air interface connection in the target air interface connection set.

With reference to the first possible implementation manner of the second aspect, in a second possible implementation manner, the resource consumption information is used to indicate consumed air interface duration, and the determining resource consumption information of the to-be-detected service on the target air interface connection includes: determining connection duration of the target air interface connection according to the air interface connection information; determining, according to the air interface connection information and the service information, whether the target air interface connection transmits data of another service; and if it is determined that the target air interface connection transmits data of the another service, determining, according to transmission consumption of the data of the to-be-detected service on the target air interface connection, transmission consumption of the data of the another service on the target air interface connection, and the connection duration of the target air interface connection, air interface duration consumed on the target air interface connection by the to-be-detected service, where the transmission consumption includes a quantity of times of transmission or transmission duration; or if it is determined that the target air interface connection does not transmit data of the another service, determining that air interface duration consumed on the target air interface connection by the to-be-detected service is the connection duration of the target air interface connection.

With reference to the second possible implementation manner of the second aspect, in a third possible implementation manner, the determining the air interface resource consumption information of the to-be-detected service according to the resource consumption information of the to-be-detected service on each target air interface connection in the target air interface connection set includes: determining that air interface duration consumed by the to-be-detected service is a sum of air interface duration consumed on each target air interface connection in the target air interface connection set by the to-be-detected service.

With reference to the second possible implementation manner or the third possible implementation manner of the second aspect, in a fourth possible implementation manner, the determining, according to transmission consumption of the data of the to-be-detected service on the target air interface connection, transmission consumption of the data of the another service on the target air interface connection, and the connection duration of the target air interface connection, air interface duration consumed on the target air interface connection by the to-be-detected service includes: determining, according to the service information, the transmission consumption of the data of the to-be-detected service on the target air interface connection as C1; determining, according to the service information, the transmission consumption of the data of the another service on the target air interface connection as C2; and determining the air interface duration consumed on the target air interface connection by the to-be-detected service as $C1/(C1+C2) \times T$, where T is the connection duration of the target air interface connection.

With reference to the third possible implementation manner or the fourth possible implementation manner of the second aspect, in a fifth possible implementation manner, the service information further includes traffic information generated between the time points at which the UE starts and stops transmitting the data of the service; and the method further includes: determining, according to the service information, traffic generated by the to-be-detected service; and determining, according to the traffic generated by the to-be-detected service and the air interface duration consumed by the to-be-detected service, air interface duration consumed by unit traffic of the to-be-detected service.

With reference to the first possible implementation manner of the second aspect, in a sixth possible implementation manner, the resource consumption information is used to indicate a quantity of times of air interface connection that is consumed; and the determining resource consumption information of the to-be-detected service on the target air interface connection includes: determining, according to the air interface connection information and the service information, whether data that is transmitted on the target air interface connection for the first time is the data of the to-be-detected service; and if the data that is transmitted on the target air interface connection for the first time is the data of the to-be-detected service, determining that the to-be-detected service consumes the target air interface connection once.

With reference to the sixth possible implementation manner of the second aspect, in a seventh possible implementation manner, the determining the air interface resource consumption information of the to-be-detected service according to the resource consumption information of the to-be-detected service on each target air interface connection in the target air interface connection set includes: determining that a quantity of times of air interface connection consumed by the to-be-detected service is a sum of quantities of times of connection consumed on the target air interface connection in the target air interface connection set by the to-be-detected service.

With reference to the sixth possible implementation manner or the seventh possible implementation manner of the second aspect, in an eighth possible implementation manner, the service information further includes traffic information generated between the time points at which the UE starts and stops transmitting the data of the service; and the method further includes: determining, according to the service information, traffic generated by the to-be-detected service; and determining, according to the traffic generated by the to-be-detected service and the quantity of times of air interface connection consumed by the to-be-detected service, a quantity of times of air interface connection consumed by unit traffic of the to-be-detected service.

With reference to the second aspect or anyone of the foregoing implementation manners, in a ninth possible implementation manner, the control plane entity includes a base station or a base station controller, and the air interface connection includes a radio resource RR connection, a radio resource control RRC connection, a temporary block flow TBF bearer, or a radio bearer RB.

With reference to the second aspect or any one of the first possible implementation manner to the eighth possible implementation manner of the second aspect, in a tenth possible implementation manner, the control plane entity includes a mobility management network element, and the air interface connection includes an Iu/S1 connection.

With reference to the second aspect or any one of the foregoing implementation manners, in an eleventh possible implementation manner, the data plane entity includes a serving gateway or a data gateway.

According to a third aspect, a detecting apparatus is provided, including: a communications unit and a processor, where the communications unit receives, from a control plane entity, air interface connection information of a user equipment UE, where the air interface connection information includes time points at which the UE establishes and releases an air interface connection. The communications unit further receives, from a data plane entity, service information of the UE, where the service information includes time points at which the UE starts and stops transmitting data of a service, and the service includes a to-be-detected service. The processor determines a target air interface connection set according to the air interface connection information and the service information that are received by the communications unit, where the target air interface connection set includes one or more target air interface connections, and the target air interface connection is an air interface connection transmitting data of the to-be-detected service; and the processor further determines air interface resource consumption information of the to-be-detected service according to the target air interface connection set.

In the embodiments of the present invention, because time points at which a UE establishes and releases an air interface connection are collected from a control plane entity, and time points at which the UE starts and stops transmitting data of a service are collected from a data plane entity, a target air interface connection transmitting a to-be-detected service can be accurately obtained by matching according to the foregoing time information, so that statistics about air interface resource consumption information of the to-be-detected service can be accurately collected according to a resource occupation situation of the target air interface connection.

BRIEF DESCRIPTION OF DRAWINGS

To describe the technical solutions in the embodiments of the present invent ion more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a Global System for Mobile Communications (Global System for Mobile Communications, GSM), a Code Division Multiple Access (Code Division Multiple Access, CDMA) system, a Wideband Code Division Multiple Access (Wideband Code Division Multiple Access Wireless, WCDMA), a general packet radio service (General Packet Radio Service, GPRS), a Long Term Evolution (Long Term Evolution, LTE), and a Universal Mobile Telecommunications System (Universal Mobile Telecommunications System, UMTS).

AUE, also referred to as a mobile terminal (Mobile Terminal), a mobile user equipment, and the like, may communicate with one or more core networks through a radio access network (for example, Radio Access Network, RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges data with the radio access network.

Figure 1A:
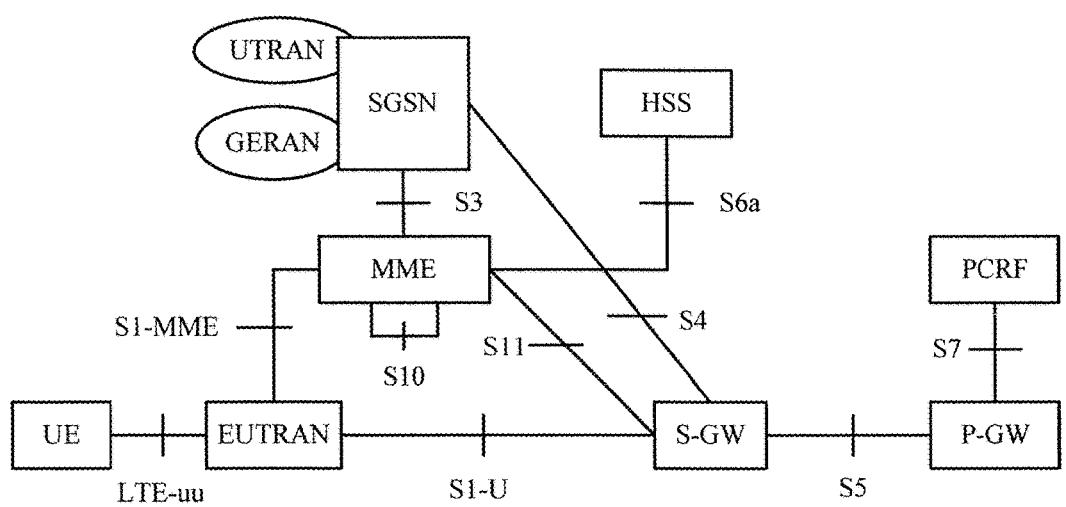
FIG. 1A is a schematic diagram of a system architecture that may be applied in the embodiments of the present invention.

FIG. 1A is a schematic diagram of a system architecture that may be applied in the embodiments of the present invention.

In FIG. 1A, System Architecture Evolution (SAE, System Architecture Evolution) is used as an example for description. As shown in FIG. 1A, in this architecture, the following parts are included:

an evolved UMTS terrestrial radio access network (Evolved UMTS Terrestrial Radio Access Network, E-UTRAN), configured to implement a function related to a radio evolved network;

a mobility management entity (Mobility Management Entity, MME), responsible for mobility management of a control plane, for example, user context and mobile status management and user temporary identity allocation;

a serving gateway entity (Serving Gateway, S-GW), which is a data plane anchor between 3rd Generation Partnership Project (The 3rd Generation Partnership Project, 3GPP) access networks;

a packet data network gateway entity (Packet Data Network Gateway, PGW), which is a user plane anchor between a 3GPP access network and a non-3GPP access network, and an interface with an external packet data network (PDN, Packet Data Network);

a policy and charging rules function entity (PCRF, Policy and Charging Rules Function), configured to set a flow-based charging rule and an application-based charging rule;

a home subscriber server (HSS, Home Subscriber Server), configured to store user subscription information;

a UMTS terrestrial radio access network (UTRAN, UMTS Terrestrial Radio Access Network) and a GSM/EDGE radio access network (GERAN, GSM/EDGE Radio Access Network), configured to implement all functions related to radio in an existing GPRS/UMTS network; and a serving general packet radio service support node (SGSN, Serving GPRS Support Node), configured to implement functions such as routing and forwarding, mobility management, session management, and user information storage in a GPRS/UMTS network.

As shown in FIG. 1A, a UE may perform control plane and user plane interactions with the E-UTRAN by using an LTE-uu interface. The EUTRAN may communicate with the MME by using an S1-MME interface. The EUTRAN may communicate with the SGW by using an S1-U interface. The MME may communicate with the SGSN by using an S3 interface. Multiple MMEs may communicate with each other by using an S10 interface. The MME may communicate with the SGW by using an S11 interface. The SGSN may communicate with the SGW by using an S4 interface. The MME may communicate with the HSS by using an S6a interface. The SGW may communicate with the PGW by using an S5 interface. The PGW may communicate with the PCRF by using an S7 interface.

Figure 1B:
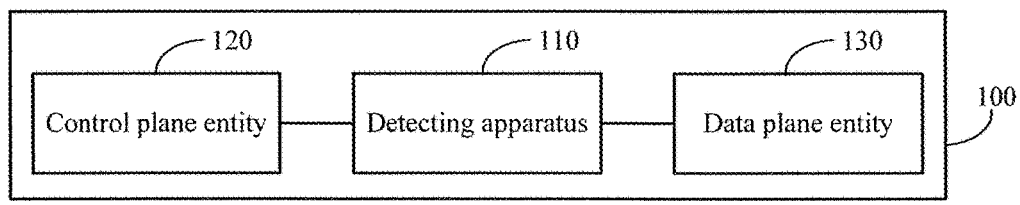
FIG. 1B is a schematic diagram of a communications system according to an embodiment of the present invention.

FIG. 1B is a schematic diagram of a communications system according to an embodiment of the present invention.

As shown in FIG. 1B, a system 100 may include a detecting apparatus 110, a control plane entity 120, and a data plane entity 130.

The detecting apparatus 110 may be deployed inside an existing network element, or may be deployed as an independent entity. For example, the detecting apparatus 110 may be deployed in a network management system (Network Management System, NMS).

The control plane entity 120 has a control plane function and can perceive control plane signaling. The control plane entity 120 may be any one of the following: a base station, a base station controller, a mobility management network element, and a control plane probe.

The base station and the base station controller are network elements of an access network; in this embodiment of the present invention, the base station and the base station controller may be collectively referred to as a base station device. For example, in GSM, the control plane entity may be a base station controller (Base Station Controller, BSC). In UMTS, the control plane entity may be a radio network controller (Radio Network Controller, RNC), In an LTE system, the control plane entity may be an evolved base station (evolved Node B, eNB or e-NodeB)

The mobility management network element is a network element of a core network. For example, in UMTS, the mobility management network element may be a serving GPRS support node (Serving GPRS Support Node, SGSN). In an LTE system, the mobility management network element may be an MME.

The control plane probe can perceive control plane signaling. For example, in GSM, the control plane probe may be an Abis probe, and the Abis probe can perceive control plane signaling transmitted on an Abis interface between a base transceiver station (Base Transceiver Station, BTS) and a BSC. In UMTS, the control plane probe may be an Iub probe, and the Iub probe can perceive control plane signaling transmitted on an Iub interface between an RNC and a base station (Node B). Furthermore, in UMTS, the control plane probe may also be an Iu probe, and the Iu probe can perceive control plane signaling transmitted on an Iu interface between an RNC and a core network. In an LTE system, the control plane probe may be an S1 probe, and the S1 probe can perceive control plane signaling on an S1-MME interface between an eNB and a core network. It should be noted that the Iu interface and the S1-MME interface are generally considered as interfaces between a base station device and a core network device, and in a process of establishing and releasing an air interface connection between a base station and a user equipment, the Iu interface and the S1-MME interface have corresponding control plane signaling to transmit, and therefore, establishment and release of the air interface connection between the base station and the user equipment can also be determined by detecting the Iu interface and the S1-MME interface. For ease of description, in this embodiment of the present invention, an Iu connection and an S1 connection are also referred to as an air interface connection, and therefore, air interface connection information of a user equipment acquired from a control plane device may include Iu/S1 connection information.

The data plane entity 130 has a data plane function and can perform data plane analysis, for example, deep packet inspection (Deep Packet Inspection, DPI). The data plane entity 130 may be any one of the following: a serving gateway, a data gateway, and a data plane probe.

The serving gateway and the data gateway are network elements of a core network; in this embodiment of the present invention, the serving gateway and the data gateway may be collectively referred to as a core network gateway. For example, in GSM or UMTS, the data plane entity may be a gateway GPRS support node (Gateway GPRS Support Node, GGSN). In an LTE system, the data plane entity may be a serving gateway (Serving Gateway, SGW) or a packet data network gateway (Packet Data Network Gateway, PGW).

The data plane probe can perceive data plane information, for example, service flow information. For example, in UMTS, the data plane probe may be a Gb probe, and the Gb probe can perceive data plane information transmitted on a Gb interface between an SGSN and a base station subsystem (Base Station Subsystem, BSS). In UMTS, the data plane probe may also be an Iu probe, and the Iu probe can perceive data plane information transmitted on an Iu interface between an RNC and a core network. In an LTE system, the data plane probe may be an S1-U probe, an S5/S8 probe, or an SGi probe, the S1-U probe can perceive data plane information transmitted on an S1-U interface between an eNB and an SGW, the S5-S8 probe can perceive data plane information transmitted on an S5/S8 interface between an SGW and a PGW, and the SGi probe can perceive data plane information transmitted on an SGi interface between a PGW and a packet data network (Packet Data Network, PDN). In a GSM system or UMTS, the data plane probe may also be a Gi probe, and the Gi probe can perceive data plane information transmitted on a Gi interface between a GGSN and a packet data network (Packet Data Network, PDN). The data plane probe may also be a Gn probe, and the Gn probe can perceive data plane information transmitted on a Gn interface between an SGSN and a GGSN.

The control plane entity 120 may send air interface connection information of a UE to the detecting apparatus 110, where the air interface connection information may include a time point at which the UE establishes an air interface connection and a time point at which the UE releases the air interface connection. For example, the air interface connection information may include the following content: (1) UE ID1, 13:00, connection 1, establish; and (2) UE ID1, 13:05, connection 1, release. It may be considered that within a period of time from the time point at which the UE establishes the air interface connection to the time point at which the UE releases the air interface connection, the UE establishes an air interface connection once. The control plane entity 120 may send, to the detecting apparatus 110 at a time, multiple groups of time points at which the UE establishes an air interface connection and time points at which the UE releases the air interface connection, or may send, to the detecting apparatus 110 at a time, one group of time points at which the UE establishes an air interface connection and time points at which the UE releases the air interface connection, or may send, to the detecting apparatus 110 at a time, one time point at which the UE establishes an air interface connection or one time point at which the UE releases an air interface connection. A person skilled in the art may understand that the foregoing descriptions are merely examples of manners in which the control plane entity 120 sends the air interface connection information of the UE to the detecting apparatus 110, and there may be many other manners, which is not limited in this embodiment of the present invention.

The data plane entity 130 may send service information of the UE to the detecting apparatus 110, where the service information may include time points at which the UE starts and stops transmitting data of a service. For example, the service information may include the following content: (1) UE ID1, 13:01, video service, start; and (2) UE ID1, 13:04, video service, stop. It may be considered that within a period of time from the time point at which the UE starts transmitting the data of the service to the time point at which the UE stops transmitting the data of the service, the UE performs data transmission of the service once. The data plane entity 130 may send, to the detecting apparatus 110 at a time, multiple groups of time points at which the UE starts and stops transmitting the data of the service, or may send, to the detecting apparatus 110 at a time, one group of time points at which the UE starts and stops transmitting the data of the service, or may send, to the detecting apparatus 110 at a time, a time point at which the UE starts transmitting the data of the service or a time point at which the UE stops transmitting the data of the service. A person skilled in the art may understand that the foregoing descriptions are merely examples of manners in which the data plane entity 130 sends the service information of the UE to the detecting apparatus 110, and there may be many other manners, which is not limited in this embodiment of the present invention. The service described above includes a to-be-detected service, and may further include another service. In this embodiment of the present invention, the to-be-detected service refers to a service for which statistics about air interface resource consumption needs to be collected. The data plane entity 130 may record, only for the to-be-detected service of the UE, time points at which the UE starts and stops transmitting data of the to-be-detected service, and send the time points to the detecting apparatus 110, or may record, for all services of the UE, time points at which the UE starts and stops transmitting data of the services, and send the time points to the detecting apparatus 110, which is not limited in this embodiment of the present invention.

After receiving the air interface connection information and the service information of the UE, the detecting apparatus 110 may determine a target air interface connection set according to the received air interface connection information and service information, where the target air interface connection set includes one or more target air interface connections.

Exemplarily, the detecting apparatus 110 may determine, according to the air interface connection information, a period of time A from establishing to releasing the air interface connection, and the detecting apparatus may determine, according to the service information, a period of time B from starting to stopping one data transmission of the to-be-detected service; when the period of time A includes the period of time B, for example, the period of time A is 8:00-9:00, and the period of time B is 8:15-8:20, it may be determined that data of the to-be-detected service is transmitted on this air interface connection once. In this embodiment of the present invention, an air interface connection transmitting data of the to-be-detected service is referred to as a target air interface connection. A person skilled in the art may understand that one target air interface connection may transmit data of the to-be-detected service for multiple times. A person skilled in the art may understand that criteria for determining a target air interface connection may be different according to different requirements, for example, an air interface connection that transmits data of the to-be-detected service and whose duration exceeds a threshold is considered as a target air interface connection. Therefore, the target air interface connection may be further understood as an air interface connection that meets a particular condition and transmits data of the to-be-detected service, where the particular condition that needs to be met is not limited in this embodiment of the present invention. Although there may be different understandings about the target air interface connection, it may be understood that the target air interface connection is an air interface connection transmitting data of the to-be-detected service.

The detecting apparatus 110 may determine one or more target air interface connections according to the air interface connection information and the service information of the UE. For ease of description, the one or more target air interface connections determined by the detecting apparatus 110 may be referred to as a target air interface connection set, that is, the target air interface connection set includes one or more target air interface connections. After determining the target air interface connection set, the detecting apparatus 110 may determine air interface resource consumption information of the to-be-detected service according to the target air interface connection set. Exemplarily, the air interface resource consumption information may include consumed air interface duration, a quantity of times of air interface connection that is consumed, or consumed air interface traffic, which is not limited in this embodiment of the present invention.

As an optional solution for acquiring air interface resource consumption information of the to-be-detected service, the detecting apparatus 110 may determine air interface duration consumed by the to-be-detected service.

Figure 2:
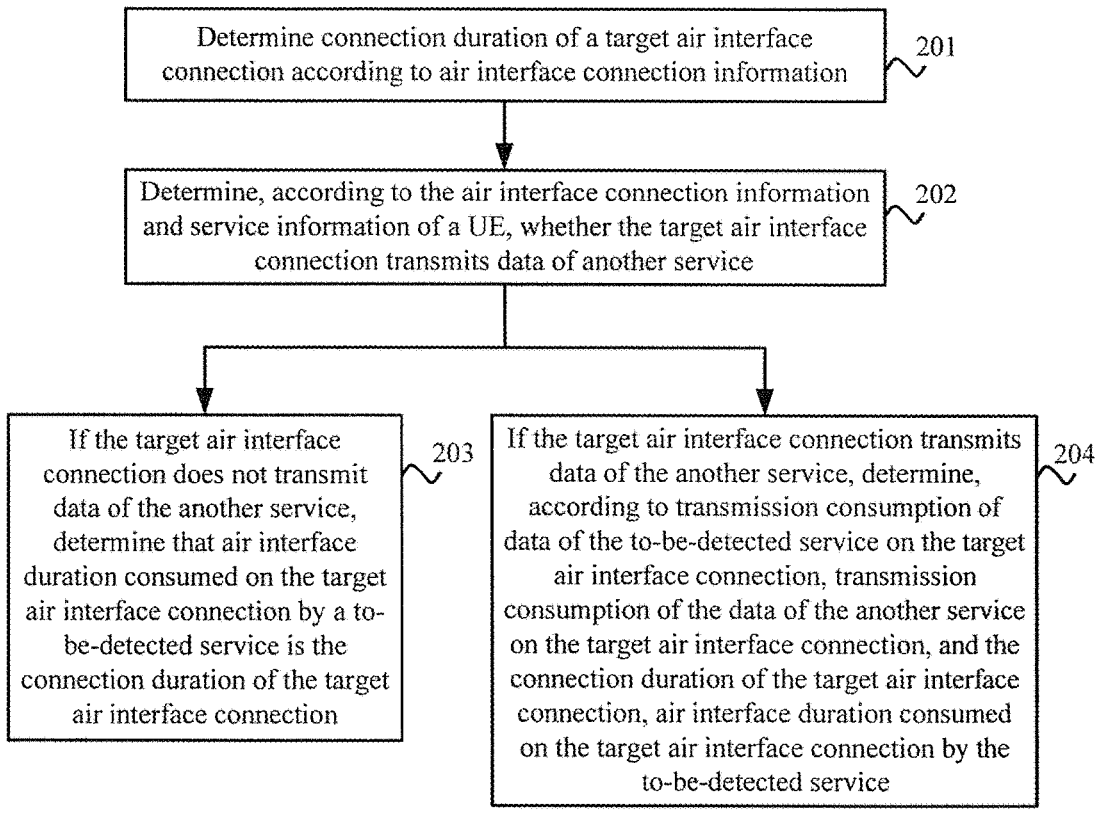
FIG. 2 is a schematic flowchart of a method for determining air interface duration consumed on a single target air interface connection by a to-be-detected service according to an embodiment of the present invention.

Exemplarily, after determining the target air interface connection set, the detecting apparatus 110 may determine, according to air interface duration consumed on each target air interface connection in the target air interface connection set by the to-be-detected service, the air interface duration consumed by the to-be-detected service. Air interface duration consumed on a single target air interface connection by the to-be-detected service may be determined by using the following method. FIG. 2 is a schematic flowchart of a method for determining air interface duration consumed on a single air interface connection by a to-be-detected service according to an embodiment of the present invention. As shown in FIG. 2:

201: Determine connection duration of the target air interface connection according to the air interface connection information.

202: Determine, according to the air interface connection information and the service information of the UE, whether the target air interface connection transmits data of another service.

203: If the target air interface connection does not transmit data of the another service, determine that air interface duration consumed on the target air interface connection by the to-be-detected service is the connection duration of the target air interface connection.

204: If the target air interface connection transmits data of the another service, determine, according to transmission consumption of the data of the to-be-detected service on the target air interface connection, transmission consumption of the data of the another service on the target air interface connection, and the connection duration of the target air interface connection, air interface duration consumed on the target air interface connection by the to-be-detected service.

Steps 201, 202, and 203 may constitute one technical solution, and steps 201, 202, and 204 may also constitute one technical solution.

Exemplarily, in a case in which the target air interface connection does not transmit data of the another service, air interface duration consumed on the target air interface connection by the to-be-detected service may be further determined according to another condition or formula, which is not limited in this embodiment of the present invention. For example, accumulative duration of transmitting data of the to-be-detected service on the target air interface connection is used as the air interface duration consumed on the target air interface connection.

Exemplarily, in a case in which the target air interface connection transmits data of the another service, the air interface duration consumed on the target air interface connection by data of the to-be-detected service may be determined through comparison between the transmission consumption of the data of the to-be-detected service on the target air interface connection and the transmission consumption of the data of the another service on the target air interface connection. The transmission consumption in this embodiment of the present invention may be transmission duration of data, or may be a quantity of times of transmission of data, or may be another parameter that can be detected, for example, traffic. To facilitate understanding, an example is provided as follows: assuming that data of the to-be-detected service is transmitted on the target air interface connection for x times, and total transmission duration is t1, and that data of the another service is transmitted on the target air interface connection for y times, and total transmission duration is t2, and assuming that the connection duration of the target air interface connection is T, according to the exemplary solution provided by this embodiment of the present invention, the air interface duration consumed on the target air interface connection by the to-be-detected service is $(x/(x+y)) \times T$ or $(t1/(t1+t2)) \times T$.

To facilitate understanding, a more intuitive example is provided below:

(1) Assume that T=5 minutes, that is, the connection duration of the target air interface connection is 5 minutes. Within the 5 minutes, the UE initiates 10 flows, where 5 flows belong to an instant chat service, and 5 flows belong to a browse service. It is assumed that the instant chat service is the to-be-detected service. In this case, the detecting apparatus may decompose the connection duration according to a proportion of a quantity of flows of the instant chat service in a total quantity of flows on the target air interface connection, to obtain that air interface duration consumed on the target air interface connection by the instant chat service is 2.5 minutes. If the browse service is the to-be-detected service, the detecting apparatus may decompose the connection duration according to a proportion of a quantity of flows of the browse service in a total quantity of flows on the target air interface connection, to obtain that air interface duration consumed on the target air interface connection by the browse service is 2.5 minutes.

(2) Assume that T=5 minutes, that is, the connection duration of the target air interface connection is 5 minutes. Within the 5 minutes, data of a video service and data of a File Transfer Protocol (File Transfer Protocol, FTP) service are transmitted. It is assumed that transmission duration of the data of the video service is 1 minute, and that transmission duration of the data of the FTP service is 1 minute. If the video service is the to-be-detected service, the detecting apparatus may decompose the connection duration according to a proportion of the transmission duration of the video service in total transmission duration, to obtain that air interface duration consumed on the target air interface connection by the video service is 2.5 minutes. If the FTP service is the to-be-detected service, the detecting apparatus may decompose the connection duration according to a proportion of the transmission duration of the FTP service in total transmission duration, to obtain that air interface duration consumed on the target air interface connection by the FTP service is 2.5 minutes.

A person skilled in the art should understand that, in a case in which the target air interface connection transmits data of the another service, there may be other calculating methods for calculating the air interface duration consumed on the target air interface connection by the to-be-detected service, which is not limited in this embodiment of the present invention.

Exemplarily, after the air interface duration consumed on each target air interface connection in the target air interface connection set by the to-be-detected service is determined, the air interface duration consumed by the to-be-detected service may be obtained. For example, a sum of air interface duration consumed on each target air interface connection in the target air interface connection set is used as the air interface duration consumed by the to-be-detected service. A person skilled in the art may understand that there may be other methods for acquiring, according to the air interface duration consumed on each target air interface connection in the target air interface connection set, the air interface duration consumed by the to-be-detected service, for example, air interface duration consumed on target air interface connections in the target air interface connection set that meet a particular condition is accumulated to obtain the air interface duration consumed by the to-be-detected service, which is not limited in this embodiment of the present invention.

As another optional solution for acquiring air interface resource consumption info Elation of the to-be-detected service, the detecting apparatus 110 may determine a quantity of times of air interface connection consumed by the to-be-detected service.

Exemplarily, after determining the target air interface connection set, the detecting apparatus 110 may determine, according to a situation of consumption of the target air interface connections in the target air interface connection set by the to-be-detected service, the quantity of times of air interface connection consumed by the to-be-detected service.

For example, for each target air interface connection in the target air interface connection set, it is determined, according to the air interface connection information and the service information, whether data that is transmitted on the target air interface connection for the first time is the data of the to-be-detected service; and if the data that is transmitted on the target air interface connection for the first time is the data of the to-be-detected service, it is determined that the to-be-detected service consumes the target air interface connection, and it may be considered that the to-be-detected service consumes the air interface connection once. Alternatively, if the data that is transmitted on the target air interface connection for the first time is not the data of the to-be-detected service, but is data of another service, it may be considered that the to-be-detected service does not consume the target air interface connection. By counting a quantity of target air interface connections consumed in the target air interface connection set by the to-be-detected service, the quantity of times of air interface connection consumed by the to-be-detected service can be obtained. A person skilled in the art should understand that there may be other methods for determining that the to-be-detected service consumes the target air interface connection, for example, if it is determined that transmission duration of the to-be-detected service on the target air interface connection is the longest or exceeds a threshold, it is considered that the to-be-detected service consumes the target air interface connection, which is not limited in this embodiment of the present invention.

To compare air interface resource consumption situations of different to-be-detected services more intuitively, consideration may be taken as to calculating an air interface resource consumption situation of the to-be-detected service based on unit traffic, for example, air interface duration consumed by unit traffic, or a quantity of times of connection consumed by unit traffic.

Exemplarily, traffic generated by the to-be-detected service may be determined according to the service information. The service information may further include traffic information generated between the time points at which the UE starts and stops transmitting the data of the service. For example, the service information may include the following content: UE ID1, 13:01, video service, start; UE ID1, 13:04, video service, stop; and UE ID1, 13:01-13:04, video service, traffic 10 M. The traffic generated by the to-be-detected service may be total traffic transmitted on all target air interface connections in the target air interface connection set by the to-be-detected service, or may be total traffic transmitted, by the to-be-detected service, on some target air interface connections in the target air interface connection set that meet a particular condition, or the traffic generated by the to-be-detected service may be directly determined according to a sum of traffic that is transmitted by the to-be-detected service and is recorded in the service information. The traffic generated by the to-be-detected service may specifically be determined by using different methods according to different network requirements, which is not limited in this embodiment of the present invention. After the traffic generated by the to-be-detected service is determined, air interface duration or a quantity of times of air interface connection consumed by unit traffic of the to-be-detected service may be determined according to the determined air interface duration or quantity of times of air interface connection consumed by the to-be-detected service.

In this embodiment of the present invention, according to time points at which a TIE establishes and releases an air interface connection that are collected from a control plane entity, and time points at which the TIE starts and stops transmitting data of a service that are collected from a data plane entity, a target air interface connection transmitting a to-be-detected service can be accurately obtained through matching, so that statistics about a resource consumption situation of the to-be-detected service on the target air interface connection can be collected, which is more accurate than a manual dialing test manner or a probe manner.

In addition, the control plane entity and the data plane entity may separately report the air interface connection information of the UE and the service information of the UE in real time, the detecting apparatus may analyze and determine air interface resource consumption information of the to-be-detected service in real time according to the information reported in real time, which can ensure the real-time quality of a statistical result of air interface resources consumed by the service.

Furthermore, because the data plane entity is implemented by a network element in a live network, types of various services initiated by the UE in the live network can be detected, and therefore statistics about air interface resources consumed by various to-be-detected services can be collected.

Figure 3A:
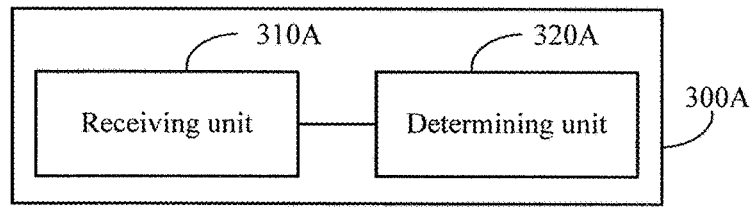
FIG. 3A is a schematic block diagram of a detecting apparatus according to an embodiment of the present invention.

FIG. 3A is a schematic block diagram of a detecting apparatus according to an embodiment of the present invention. The detecting apparatus is generally deployed on a network element implementing a network management system function, or may be deployed on another existing network element, which is not limited in this embodiment of the present invention. The detecting apparatus shown in FIG. 3A may be used to implement a function of the detecting apparatus in the system shown in FIG. 1B. Content like explanations, descriptions, and examples of the technical solution in the related embodiment shown in FIG. 2 can be applied to the related embodiment shown in FIG. 3A by a person skilled in the art directly or after simple modification, and therefore some content is not further described herein. A detecting apparatus 300A shown in FIG. 3A includes a receiving unit 310A and a determining unit 320A.

The receiving unit 310A is configured to receive, from a control plane entity, air interface connection information of a UE, and receive, from a data plane entity, service information of the UE. The air interface connection information includes time points at which the UE establishes and releases an air interface connection, the service information includes time points at which the UE starts and stops transmitting data of a service, and the service includes a to-be-detected service.

The determining unit 320A is configured to determine a target air interface connection set according to the air interface connection information received by the receiving unit 310A and the service information received by the receiving unit 310A, and determine air interface resource consumption information of the to-be-detected service according to the target air interface connection set. The target air interface connection set includes one or more target air interface connections, and the target air interface connection is an air interface connection transmitting data of the to-be-detected service.

As an optional implementation manner, the determining unit 320A may be configured to determine, for each target air interface connection in the target air interface connection set, resource consumption information of the to-be-detected service on the target air interface connection; and determine the air interface resource consumption information of the to-be-detected service according to the resource consumption information of the to-be-detected service on each target air interface connection in the target air interface connection set.

The following describes in further detail examples in which the air interface resource consumption information is separately used to indicate consumed air interface duration and a quantity of times of air interface connection that is consumed.

(1) A case in which the resource consumption information is used to indicate consumed air interface duration:

Correspondingly, that the determining unit 320A is configured to determine the resource consumption information of the to-be-detected service on the target air interface connection is specifically that: the determining unit 320A is configured to determine connection duration of the target air interface connection according to the air interface connection information; determine, according to the air interface connection information and the service information, whether the target air interface connection transmits data of another service; and if it is determined that the target air interface connection transmits data of the another service, determine, according to transmission consumption of the data of the to-be-detected service on the target air interface connection, transmission consumption of the data of the another service on the target air interface connection, and the connection duration of the target air interface connection, air interface duration consumed on the target air interface connection by the to-be-detected service, where the transmission consumption includes a quantity of times of transmission or transmission duration; or, if it is determined that the target air interface connection does not transmit data of the another service, determine that air interface duration consumed on the target air interface connection by the to-be-detected service is the connection duration of the target air interface connection.

Exemplarily, that the determining unit 320A is configured to determine, according to transmission consumption of the data of the to-be-detected service on the target air interface connection, transmission consumption of the data of the another service on the target air interface connection, and the connection duration of the target air interface connection, air interface duration consumed on the target air interface connection by the to-be-detected service may be specifically that: the determining unit 320A is configured to determine, according to the service information, the transmission consumption of the data of the to-be-detected service on the target air interface connection as C1; determine, according to the service information, the transmission consumption of the data of the another service on the target air interface connection as C2; and determine the air interface duration consumed on the target air interface connection by the to-be-detected service as $C1/(C1+C2) \times T$, where T is the connection duration of the target air interface connection.

In addition, that the determining unit 320A is configured to determine the air interface resource consumption information of the to-be-detected service according to the resource consumption information of the to-be-detected service on each target air interface connection in the target air interface connection set may be specifically that: the determining unit 320A is configured to determine that air interface duration consumed by the to-be-detected service is a sum of air interface duration consumed on each target air interface connection in the target air interface connection set by the to-be-detected service.

To facilitate comparing air interface resource consumption situations of different to-be-detected services, the determining unit 320A may be further configured to determine air interface resource information consumed by unit traffic of the to-be-detected service.

At the same time when the data plane entity collects the time points at which the UE starts and stops transmitting the data of the service, the data plane entity may further record traffic information generated within a period of time from starting to stopping transmission of the service. Therefore, the service information may further include traffic information generated between the time points at which the UE starts and stops transmitting the data of the service. Correspondingly, the determining unit 320A may be further configured to: determine, according to the service information, traffic generated by the to-be-detected service; and determine, according to the traffic generated by the to-be-detected service and the air interface duration consumed by the to-be-detected service, air interface duration consumed by unit traffic of the to-be-detected service.

(2) A case in which the resource consumption information is used to indicate a quantity of times of air interface connection that is consumed:

Correspondingly, that the determining unit 320A is configured to determine the resource consumption information of the to-be-detected service on the target air interface connection is specifically that: the determining unit 320A is configured to determine, according to the air interface connection information and the service information, whether data that is transmitted on the target air interface connection for the first time is the data of the to-be-detected service; and if the data that is transmitted on the target air interface connection for the first time is the data of the to-be-detected service, determine that the to-be-detected service consumes the target air interface connection once.

Furthermore, if the data that is transmitted on the target air interface connection for the first time is not the data of the to-be-detected service, the determining unit 320A may determine that the to-be-detected service does not consume the target air interface connection.

That the determining unit 320A determines the air interface resource consumption information of the to-be-detected service according to the resource consumption information of the to-be-detected service on each target air interface connection in the target air interface connection set may be specifically that: the determining unit 320A is configured to determine that a quantity of times of air interface connection consumed by the to-be-detected service is a sum of quantities of times of connection consumed on the target air interface connection in the target air interface connection set by the to-be-detected service.

The determining unit 320A may be further configured to determine a quantity of times of air interface connection consumed by unit traffic of the to-be-detected service. Therefore, the service information may further include traffic information generated between the time points at which the UE starts and stops transmitting the data of the service.

Correspondingly, the determining unit 320A may be further configured to: determine, according to the service information, traffic generated by the to-be-detected service;

and determine, according to the traffic generated by the to-be-detected service and the quantity of times of air interface connection consumed by the to-be-detected service, a quantity of times of air interface connection consumed by unit traffic of the to-be-detected service.

A person skilled in the art should understand that the control plane entity may include a base station or a base station controller. The air interface connection may include a radio resource (Radio Resource, RR) connection, a radio resource control (Radio Resource Control, RRC) connection, a temporary block flow (Temporary Block Flow, TBF) bearer, or a radio bearer (Radio Bearer, RB). The control plane entity may include a mobility management network element, and the air interface connection includes an Iu/S1 connection. The data plane entity may include a serving gateway or a data gateway.

By matching time points at which a UE establishes and releases an air interface connection that are collected from a control plane entity and time points at which the UE starts and stops transmitting data of a service that are collected from a data plane entity, the detecting apparatus shown in FIG. 3A can accurately learn a target air interface connection transmitting a to-be-detected service, and therefore can accurately collect statistics about air interface resource consumption information of the to-be-detected service according to a resource occupation situation of the to-be-detected service on the target air interface connection.

Figure 3B:
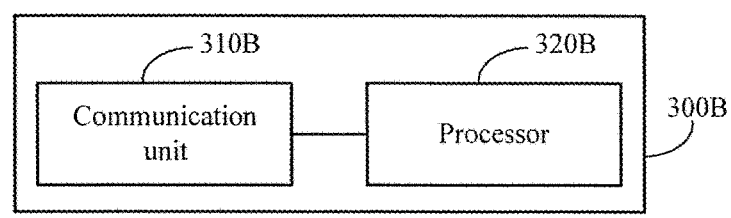
FIG. 3B is a schematic block diagram of a detecting apparatus according to another embodiment of the present invention.

A detecting apparatus 300B shown in FIG. 3B includes a communications unit 310B and a processor 320B.

The communications unit 310B can perform data communication with another network element, and may include such a communications apparatus as a network interface card, a fiber receiving module, or a USB interface.

The communications unit 310B is configured to implement a function of the receiving unit 310A in FIG. 3A, the processor 320B is configured to implement a function of the determining unit 320A in FIG. 3A, and the details are not described herein again.

Furthermore, the function of the determining unit 320A may be stored in a storage medium in the form of a program, and the processor 320B reads and executes program code that implements the function of the determining unit 320A.

By matching time points at which a UE establishes and releases an air interface connection that are collected from a control plane entity and time points at which the UE starts and stops transmitting data of a service that are collected from a data plane entity, the detecting apparatus shown in FIG. 3B can accurately learn a target air interface connection transmitting a to-be-detected service, and therefore can accurately collect statistics about air interface resource consumption information of the to-be-detected service according to a resource occupation situation of the to-be-detected service on the target air interface connection.

Figure 4:
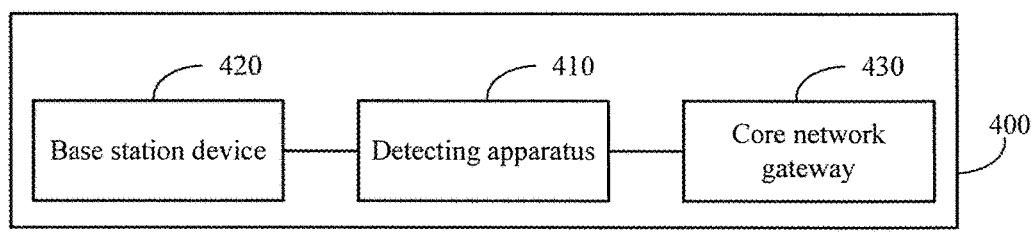
FIG. 4 is a schematic block diagram of an example of the communications system of the embodiment of the present invention shown in FIG. 1B.
Figure 5:
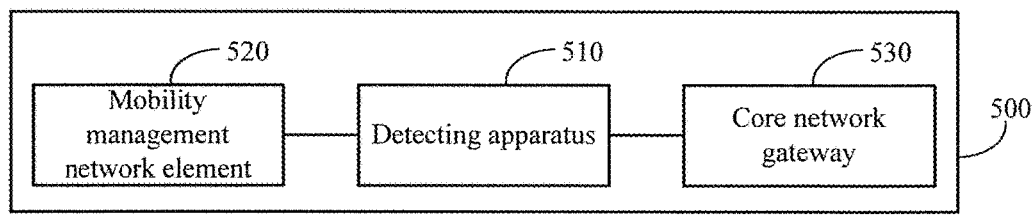
FIG. 5 is a schematic block diagram of another example of the communications system of the embodiment of the present invention shown in FIG. 1B.
Figure 6:
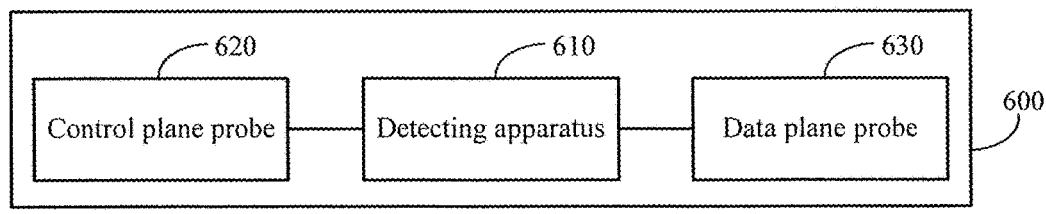
FIG. 6 is a schematic block diagram of still another example of the communications system of the embodiment of the present invention shown in FIG. 1B.

The communications system shown in FIG. 1B may be deployed in multiple manners, which are separately described byway of example with reference to FIG. 4 to FIG. 6.

FIG. 4 is a schematic block diagram of an example of the communications system of the embodiment of the present invention shown in FIG. 1B.

As shown in FIG. 4, a communications system 400 may include a detecting apparatus 410, a base station device 420, and a core network gateway 430. Both the base station device 420 and the core network gateway 430 can communicate with the detecting apparatus 410.

The base station device 420 is configured to implement a function of the control plane entity in FIG. 1B, and the base station device 420 may include a base station or a base station controller. For example, in GSM, a UE establishes an RR connection before initiating a service, and releases the RR connection after data transmission of the service is stopped. The control plane entity may be a BSC, and an air interface connection may be an RR connection. The BSC may record time points at which the RR connection is established and released. Furthermore, the air interface connection may also be a TBF bearer. The BSC may record time points at which the TBF bearer is established and released.

In UMTS, the UE establishes an RRC connection before initiating a service, and releases the RRC connection after data transmission of the service is stopped. An air interface connection may be an RRC connection, and the control plane entity may be an RNC. The RNC may record time points at which the RRC connection is established and released. Furthermore, the air interface connection may also be an RB bearer, and the RNC may record time points at which the RB bearer is established and released.

In an LTE system, the UE establishes an RRC connection before initiating a service, and releases the RRC connection after data transmission of the service is stopped. An air interface connection may be an RRC connection, and the control plane entity may be an eNB. The eNB may record time points at which the RRC connection is established and released. Furthermore, the air interface connection may also be an RB bearer, and the eNB may record time points at which the RB bearer is established and released.

The core network gateway 430 is configured to implement a function of the data plane entity in FIG. 1B, and the core network gateway 430 may include a data gateway or a serving gateway, for example, a GGSN, an SGW, or a PGW.

The detecting apparatus 410 may be the detecting apparatus shown in FIG. 3A or FIG. 3B.

FIG. 5 is a schematic block diagram of another example of the communications system of the embodiment of the present invention shown in FIG. 1B.

In FIG. 5, a communications system 500 may include a detecting apparatus 510, a mobility management network element 520, and a core network gateway 530. Both the mobility management network element 520 and the core network gateway 530 can communicate with the detecting apparatus 510.

The mobility management network element 520 is configured to implement a function of the control plane entity in FIG. 1B. The mobility management network element 520 may include an SGSN or an MME.

For example, in UMTS, the mobility management network element may be an SGSN. When a UE establishes an RRC connection, the SGSN establishes an Iu connection to an RNC. When the UE releases the RRC connection, the SGSN releases the Iu connection to the RNC. Therefore, the SGSN may record time points at which the Iu connection is established and released, so as to determine time points at which the RRC connection is established and released.

In an LTE system, the mobility management network element may be an MME. Similar to UMTS, when a UE establishes an RRC connection, the MME establishes an S1 connection to an eNB. When the UE releases the RRC connection, the MME releases the S1 connection to the eNB. Therefore, the MME may record time points at which the S1 connection is established and released, so as to determine time points at which the RRC connection is established and released.

The core network gateway 530 is configured to implement a function of the data plane entity in FIG. 1B, and the core network gateway 530 may include a GGSN, an SGW, or a PGW.

The detecting apparatus 510 may be the detecting apparatus shown in FIG. 3A or FIG. 3B.

FIG. 6 is a schematic block diagram of still another example of the communications system of the embodiment of the present invention shown in FIG. 1B.

As shown in FIG. 6, a communications system 600 may include a detecting apparatus 610, a control plane probe 610, and a data plane probe 630. The control plane probe 620 and the data plane probe 630 can communicate with the detecting apparatus 610.

In the communications system 600, the control plane probe 620 is configured to implement a function of the control plane entity in FIG. 1B. For example, in GSM, the control plane probe may be an Abis probe, and records time points at which an RR connection or a TBF bearer is established and released. In UMTS, the control plane probe may be an Iub probe or an Iu probe, and records time points at which an RRC connection or an Iu connection is established and released. In an LTE system, the control plane probe may be an S1 probe, and records time points at which an S1 connection is established and released.

The data plane probe 630 is configured to implement a function of the data plane entity in FIG. 1B. For example, in UMTS, the data plane probe may be a Gb probe or an Iu probe. In an LTE system, the data plane probe may be an S1-U probe, an S5-S8 probe, or an SGi probe. In GSM or UMTS, the data plane probe may also be a Gi probe. The data plane probe may also be a Gn probe.

The detecting apparatus 610 may be the detecting apparatus shown in FIG. 3A or FIG. 3B.

A person skilled in the art should understand that there still are other manners for deploying the system shown in FIG. 1B, which are not enumerated herein.

Based on the inventive concept of the foregoing embodiments, an embodiment of the present invention further provides a method for determining air interface resources consumed by a service. The method is not only applicable to the system exemplified in the embodiments of the present invention, but can also be applied to systems of other communications technologies along with the development of technologies.

Figure 7:
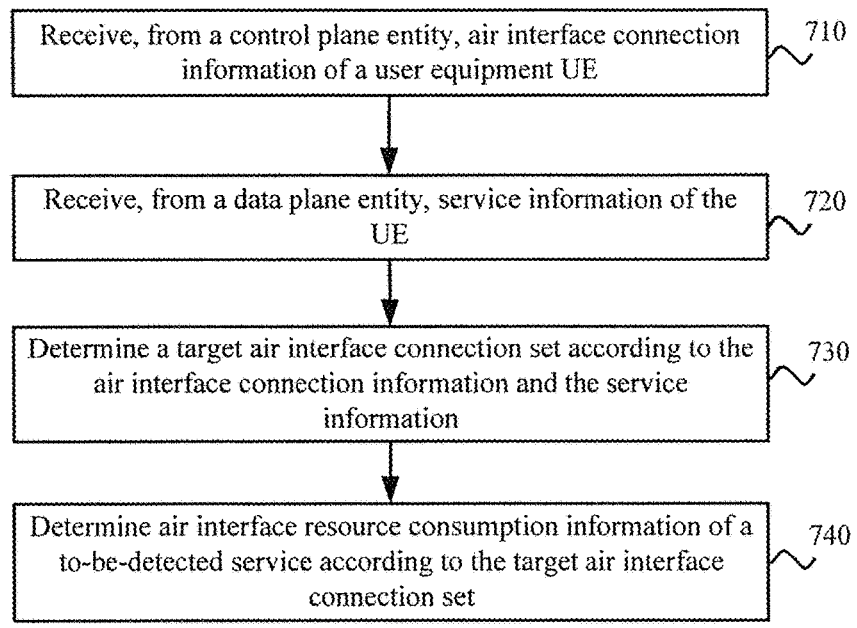
FIG. 7 is a schematic diagram of a method for determining air interface resources consumed by a service according to an embodiment of the present invention.

FIG. 7 is a schematic diagram of a method for determining air interface resources consumed by a service according to an embodiment of the present invention. The method shown in FIG. 7 may be implemented by a detecting apparatus, or may be implemented by another network element, and a specific network element for implementing the method may be selected according to different network architectures. A person skilled in the art should understand that content like explanations, descriptions, and examples involved in the embodiments shown in FIG. 1B to FIG. 6 also applies to this embodiment, and some content is not further described herein. As shown in FIG. 7:

710: Receive, from a control plane entity, air interface connection information of a user equipment UE, where the air interface connection information includes time points at which the UE establishes and releases an air interface connection.

720: Receive, from a data plane entity, service information of the UE, where the service information includes time points at which the UE starts and stops transmitting data of a service, and the service includes a to-be-detected service.

730: Determine a target air interface connection set according to the air interface connection information and the service information, where the target air interface connection set includes one or more target air interface connections, and the target air interface connection is an air interface connection transmitting data of the to-be-detected service.

740: Determine air interface resource consumption information of the to-be-detected service according to the target air interface connection set.

For content related to the determining air interface resource consumption information of the to-be-detected service according to the target air interface connection set, refer to the embodiments shown in FIG. 1B to FIG. 6, and the details are not described herein again.

In this embodiment of the present invention, because time points at which a UE establishes and releases an air interface connection are collected from a control plane entity, and time points at which the UE starts and stops transmitting data of a service are collected from a data plane entity, a target air interface connection transmitting a to-be-detected service can be accurately obtained by matching according to the foregoing time information, so that statistics about air interface resource consumption information of the to-be-detected service can be accurately collected according to a resource occupation situation of the target air interface connection.

Furthermore, there are many service types in a live network, but an existing manual dialing test method only covers limited service types. In addition, with the continuous upgrade of various types of services, it is difficult to ensure the real-time quality of a statistical result.

In this embodiment of the present invention, the control plane entity and the data plane entity can separately report the air interface connection information of the UE and the service information of the UE in real time, the detecting apparatus can analyze and determine air interface resource consumption information of the to-be-detected service in real time according to the information reported in real time, which can ensure the real-time quality of a statistical result of air interface resources consumed by the service.

In addition, because the data plane entity is implemented by a network element in a live network, the data plane entity can perform comprehensive detection on types of services initiated by a UE in the live network, and therefore can cover all types of services in the live network when collecting statistics about air interface resources consumed by a service.

In this embodiment of the present invention, the control plane entity may report air interface connection information of the UE to the detecting apparatus after each air interface connection is released. In this case, the air interface connection information may include time points at which the UE establishes and releases the air interface connection. Correspondingly, the service information of the data plane entity may include time points at which the UE starts and stops transmitting the data of the service on the air interface connection. For example, in step 720, the data plane entity may immediately report the service information of the UE to the detecting apparatus after each data transmission of the service stops. Generally, the control plane entity may report the air interface connection information by using one time of air interface connection establishment and release as a granularity, and the data plane entity may report the service information by using one time of starting and stopping service transmission as a granularity; in this way, the detecting apparatus can determine the air interface resource consumption information of the to-be-detected service more efficiently. For example, one record in the air interface connection information may include a UE identity (Identity, ID), a time point at which the air interface connection is established, and a time point at which the air interface connection is released; and one record in the service information may include a UE ID, a time point at which the UE starts transmitting the data of the service, a time point at which the UE stops transmitting the data of the service, and a service type, and optionally may further include traffic generated by the data of the service. The service type may include a type of a service flow or an application (Application) type. The service type may be obtained by the control plane entity by deep packet inspection.

Furthermore, in this embodiment of the present invention, the air interface connection information and the service information may also be periodically received by the detecting apparatus, and the control plane entity may report the air interface connection information of the UE to the detecting apparatus according to a particular period. In this case, the air interface connection information may include time points at which the UE establishes and releases one or more air interface connections within the period. Correspondingly, the data plane entity may also report the service information of the UE to the detecting apparatus according to the period. And in this case, the service information may include time points at which the UE starts and stops transmitting data of one or more types of services within the period.

Exemplarily, both the control plane entity and the data plane entity may report information according to a preset period, for example, the period may be preset to half an hour. In this way, the air interface resource consumption information of the to-be-detected service determined by the detecting apparatus is air interface resource consumption information of the to-be-detected service within the period.

It can be seen that, in this embodiment of the present invention, a time granularity for collecting statistics about air interface resource consumption can be set according to an actual requirement, thereby improving service management performance.

In this embodiment of the present invention, the air interface resource consumption of the to-be-detected service is determined by using a summation manner, that is, by determining, for each target air interface connection in the target air interface connection set, the resource consumption information of the to-be-detected service on the target air interface connection, and determining air interface resource consumption information of the to-be-detected service according to the resource consumption information of the to-be-detected service on each target air interface connection in the target air interface connection set. In other words, resource consumption information of the to-be-detected service on all the target air interface connections in the target air interface connection set may be separately determined. Then statistics about the resource consumption information of the to-be-detected service on all the target air interface connections are collected, so as to determine the air interface resource consumption information of the to-be-detected service. This manner is simple and efficient to implement. It should be noted that, in this embodiment of the present invention, determining of the air interface resource consumption information of the to-be-detected service is not limited to this manner, and may also be implemented by using another algorithm.

In this embodiment of the present invention, when the target air interface connection set includes one target air interface connection, the air interface resource consumption of the to-be-detected service on the target air interface connection is the air interface resource consumption of the to-be-detected service. When the target air interface connection set includes multiple target air interface connections, the foregoing summation manner may be used.

In this embodiment of the present invention, for determining of the air interface resource consumption of the to-be-detected service on a single target air interface connection, a situation of another service is also considered. That is, according to transmission consumption of the to-be-detected service and the another service on the target air interface connection, air interface duration consumed on the target air interface connection by the to-be-detected service is determined, and therefore accuracy of the air interface resource consumption information of the to-be-detected service can be ensured.

In this embodiment of the present invention, consideration is also taken as to obtaining air interface resource consumption information of unit traffic of the to-be-detected service, for example, air interface duration consumed by unit traffic or a quantity of times of air interface connection consumed by unit traffic, which facilitates comparing air interface resource consumption information of different to-be-detected services, thereby providing a basis for network optimization; and the to-be-detected services may also be classified according to efficiency, for example, a service in which air interface duration consumed per megabyte of traffic is more than one hour may be considered as an inefficient service. For another example, a service in which a quantity of times of connection consumed per megabyte of traffic is more than 100 may be considered as an inefficient service.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A detecting apparatus, comprising:
    a receiver, configured to:
        receive, from a control plane entity, air interface connection information of a user equipment (UE); and
        receive, from a data plane entity, service information of the UE;
        wherein the air interface connection information comprises time points at which the UE establishes and releases an air interface connection, the service information comprises time points at which the UE starts and stops transmitting data of a service, and the service comprises a to-be-detected service; and
    a processor, configured to:
        determine a target air interface connection set according to the air interface connection information and the service information; and
        determine air interface resource consumption information of the to-be-detected service according to the target air interface connection set;
        wherein the target air interface connection set comprises one or more target air interface connections, and the target air interface connection is an air interface connection transmitting data of the to-be-detected service.

2. The detecting apparatus according to claim 1, wherein the processor is configured to:
    determine, for each target air interface connection in the target air interface connection set, resource consumption information of the to-be-detected service on the target air interface connection; and
    determine the air interface resource consumption information of the to-be-detected service according to the resource consumption information of the to-be-detected service on each target air interface connection in the target air interface connection set.

3. The detecting apparatus according to claim 2, wherein:
    the resource consumption information is used to indicate consumed air interface duration; and
    when the processor determines the resource consumption information of the to-be-detected service on the target air interface connection, the processor is configured to:
        determine connection duration of the target air interface connection according to the air interface connection information;
        determine, according to the air interface connection information and the service information, whether the target air interface connection transmits data of another service; and
        if it is determined that the target air interface connection transmits data of the another service, determine, according to transmission consumption of the data of the to-be-detected service on the target air interface connection, transmission consumption of the data of the another service on the target air interface connection, and the connection duration of the target air interface connection, air interface duration consumed on the target air interface connection by the to-be-detected service, wherein the transmission consumption comprises a quantity of times of transmission or transmission duration; or
        if it is determined that the target air interface connection does not transmit data of the another service, determine that air interface duration consumed on the target air interface connection by the to-be-detected service is the connection duration of the target air interface connection.

4. The detecting apparatus according to claim 3, wherein:
    when the processor determines the air interface resource consumption information of the to-be-detected service according to the resource consumption information of the to-be-detected service on each target air interface connection in the target air interface connection set, the processor is configured to:
        determine that the air interface duration consumed by the to-be-detected service is a sum of air interface duration consumed on each target air interface connection in the target air interface connection set by the to-be-detected service.

5. The detecting apparatus according to claim 3 wherein:
    when the processor determines, according to the transmission consumption of the data of the to-be-detected service on the target air interface connection, the transmission consumption of the data of the another service on the target air interface connection, and the connection duration of the target air interface connection, the air interface duration consumed on the target air interface connection by the to-be-detected service, the processor is configured to:
        determine, according to the service information, the transmission consumption of the data of the to-be-detected service on the target air interface connection as C1;
        determine, according to the service information, the transmission consumption of the data of the another service on the target air interface connection as C2; and
        determine the air interface duration consumed on the target air interface connection by the to-be-detected service as $C1/(C1+C2) \times T$, wherein T is the connection duration of the target air interface connection.

6. The detecting apparatus according to claim 4, wherein:
the service information further comprises traffic information generated between the time points at which the UE starts and stops transmitting the data of the service; and
the processor is further configured to:
   determine, according to the service information, traffic generated by the to-be-detected service; and
   determine, according to the traffic generated by the to-be-detected service and the air interface duration consumed by the to-be-detected service, air interface duration consumed by unit traffic of the to-be-detected service.

7. The detecting apparatus according to claim 2, wherein:
the resource consumption information is used to indicate a quantity of times of air interface connection that is consumed; and
when the processor determines the resource consumption information of the to-be-detected service on the target air interface connection, the processor is configured to:
   determine, according to the air interface connection information and the service information, whether data that is transmitted on the target air interface connection for the first time is the data of the to-be-detected service; and
   when the data that is transmitted on the target air interface connection for the first time is the data of the to-be-detected service, determine that the to-be-detected service consumes the target air interface connection once.

8. The detecting apparatus according to claim 7, wherein:
when the processor determines the air interface resource consumption information of the to-be-detected service according to the resource consumption information of the to-be-detected service on each target air interface connection in the target air interface connection set, the processor is configured to:
   determine that a quantity of times of air interface connection consumed by the to-be-detected service is a sum of quantities of times of connection consumed on the target air interface connection in the target air interface connection set by the to-be-detected service.

9. The detecting apparatus according to claim 7, wherein:
the service information further comprises traffic information generated between the time points at which the UE starts and stops transmitting the data of the service; and
the processor is further configured to:
   determine, according to the service information, traffic generated by the to-be-detected service; and
   determine, according to the traffic generated by the to-be-detected service and the quantity of times of air interface connection consumed by the to-be-detected service, a quantity of times of air interface connection consumed by unit traffic of the to-be-detected service.

10. The detecting apparatus according to claim 1, wherein:
the control plane entity comprises abase station or abase station controller; and
the air interface connection comprises a radio resource (RR) connection, a radio resource control (RRC) connection, a temporary block flow (TBF) bearer, or a radio bearer (RB).

11. The detecting apparatus according to claim 1, wherein:
the control plane entity comprises a mobility management network element; and
the air interface connection comprises an Iu/S1 connection.

12. The detecting apparatus according to claim 1, wherein the data plane entity comprises a serving gateway or a data gateway.

13. A method for determining air interface resources consumed by a service, the method comprising:
   receiving, from a control plane entity, air interface connection information of a user equipment (UE), wherein the air interface connection information comprises time points at which the UE establishes and releases an air interface connection;
   receiving, from a data plane entity, service information of the UE, wherein the service information comprises time points at which the UE starts and stops transmitting data of a service, and the service comprises a to-be-detected service;
   determining a target air interface connection set according to the air interface connection info Elation and the service information, wherein the target air interface connection set comprises one or more target air interface connections, and the target air interface connection is an air interface connection transmitting data of the to-be-detected service; and
   determining air interface resource consumption information of the to-be-detected service according to the target air interface connection set.

14. The method according to claim 13, wherein determining the air interface resource consumption information of the to-be-detected service according to the target air interface connection set comprises:
   determining, for each target air interface connection in the target air interface connection set, resource consumption information of the to-be-detected service on the target air interface connection; and
   determining the air interface resource consumption information of the to-be-detected service according to the resource consumption information of the to-be-detected service on each target air interface connection in the target air interface connection set.

15. The method according to claim 14, wherein:
the resource consumption information is used to indicate consumed air interface duration; and
determining resource consumption information of the to-be-detected service on the target air interface connection comprises:
   determining connection duration of the target air interface connection according to the air interface connection information;
   determining, according to the air interface connection information and the service information, whether the target air interface connection transmits data of another service; and
   if it is determined that the target air interface connection transmits data of the another service, determining, according to transmission consumption of the data of the to-be-detected service on the target air interface connection, transmission consumption of the data of the another service on the target air interface connection, and the connection duration of the target air interface connection, air interface duration consumed on the target air interface connection by the to-be-detected service, wherein the transmission consumption comprises a quantity of times of transmission or transmission duration; or
   if it is determined that the target air interface connection does not transmit data of the another service, determining that air interface duration consumed on the target air interface connection by the to-be-detected service is the connection duration of the target air interface connection.

16. The method according to claim 15, wherein determining the air interface resource consumption information of the to-be-detected service according to the resource consumption information of the to-be-detected service on each target air interface connection in the target air interface connection set comprises:
    determining that air interface duration consumed by the to-be-detected service is a sum of air interface duration consumed on each target air interface connection in the target air interface connection set by the to-be-detected service.

17. The method according to claim 15, wherein determining, according to transmission consumption of the data of the to-be-detected service on the target air interface connection, transmission consumption of the data of the another service on the target air interface connection, and the connection duration of the target air interface connection, air interface duration consumed on the target air interface connection by the to-be-detected service comprises:
    determining, according to the service information, the transmission consumption of the data of the to-be-detected service on the target air interface connection as C1;
    determining, according to the service information, the transmission consumption of the data of the another service on the target air interface connection as C2; and
    determining the air interface duration consumed on the target air interface connection by the to-be-detected service as $C1/(C1+C2) \times T$, wherein T is the connection duration of the target air interface connection.

18. The method according to claim 16, wherein:
    the service information further comprises traffic information generated between the time points at which the UE starts and stops transmitting the data of the service; and
    the method further comprises:
        determining, according to the service information, traffic generated by the to-be-detected service; and
        determining, according to the traffic generated by the to-be-detected service and the air interface duration consumed by the to-be-detected service, air interface duration consumed by unit traffic of the to-be-detected service.

19. The method according to claim 14, wherein:
    the resource consumption information is used to indicate a quantity of times of air interface connection that is consumed; and
    determining resource consumption information of the to-be-detected service on the target air interface connection comprises:
        determining, according to the air interface connection information and the service information, whether data that is transmitted on the target air interface connection for the first time is the data of the to-be-detected service; and
        when the data that is transmitted on the target air interface connection for the first time is the data of the to-be-detected service, determining that the to-be-detected service consumes the target air interface connection once.

20. The method according to claim 19, wherein determining the air interface resource consumption information of the to-be-detected service according to the resource consumption information of the to-be-detected service on each target air interface connection in the target air interface connection set comprises:
    determining that a quantity of times of air interface connection consumed by the to-be-detected service is a sum of quantities of times of connection consumed on the target air interface connection in the target air interface connection set by the to-be-detected service.

* * * * *